Nov. 22, 1955   H. B. VALENTINE   2,724,395
AUTOMOBILE COVER
Filed Dec. 31, 1952   4 Sheets-Sheet 1
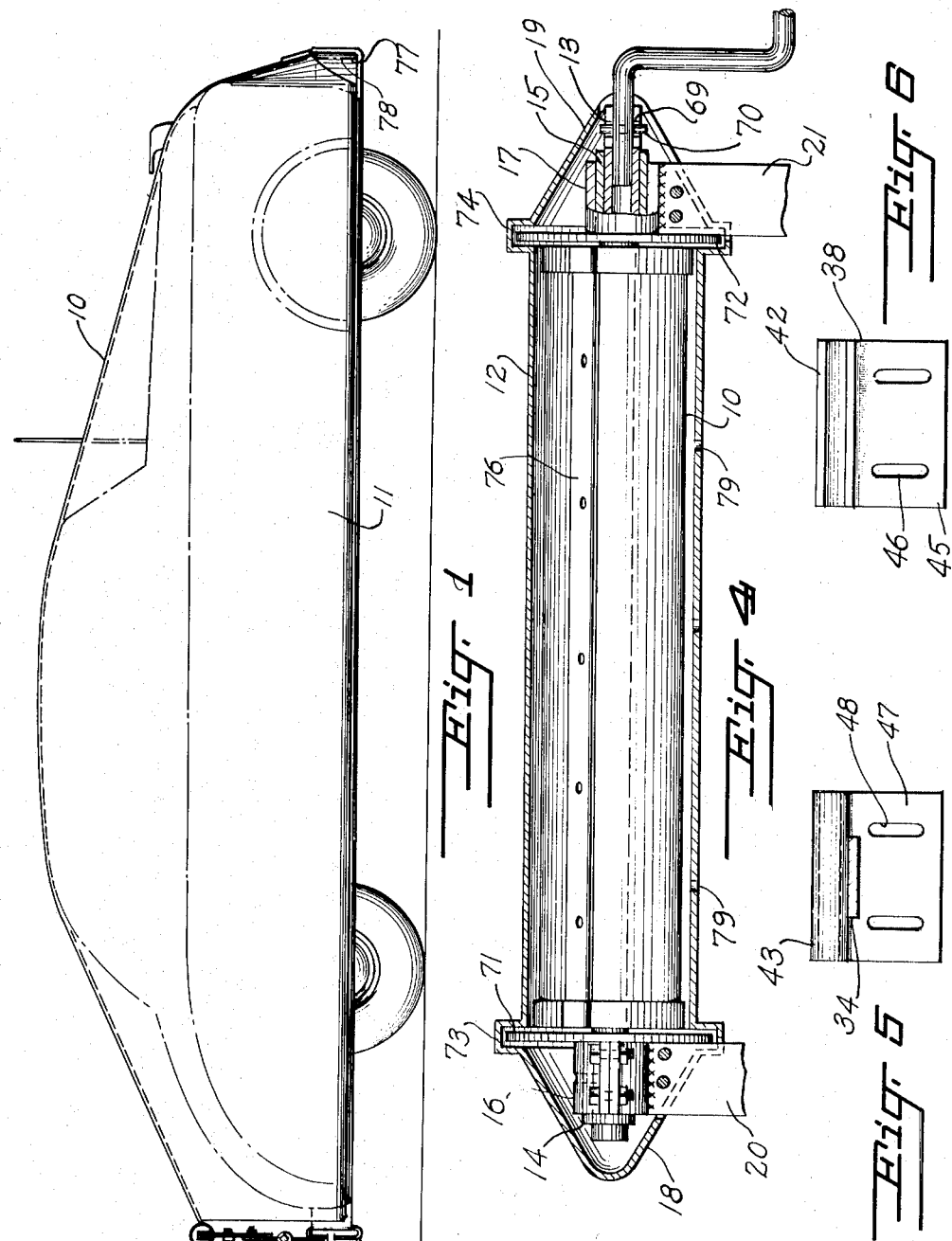
INVENTOR.
Hubert B. Valentine
BY *Victor J. Evans & Co.*
ATTORNEYS

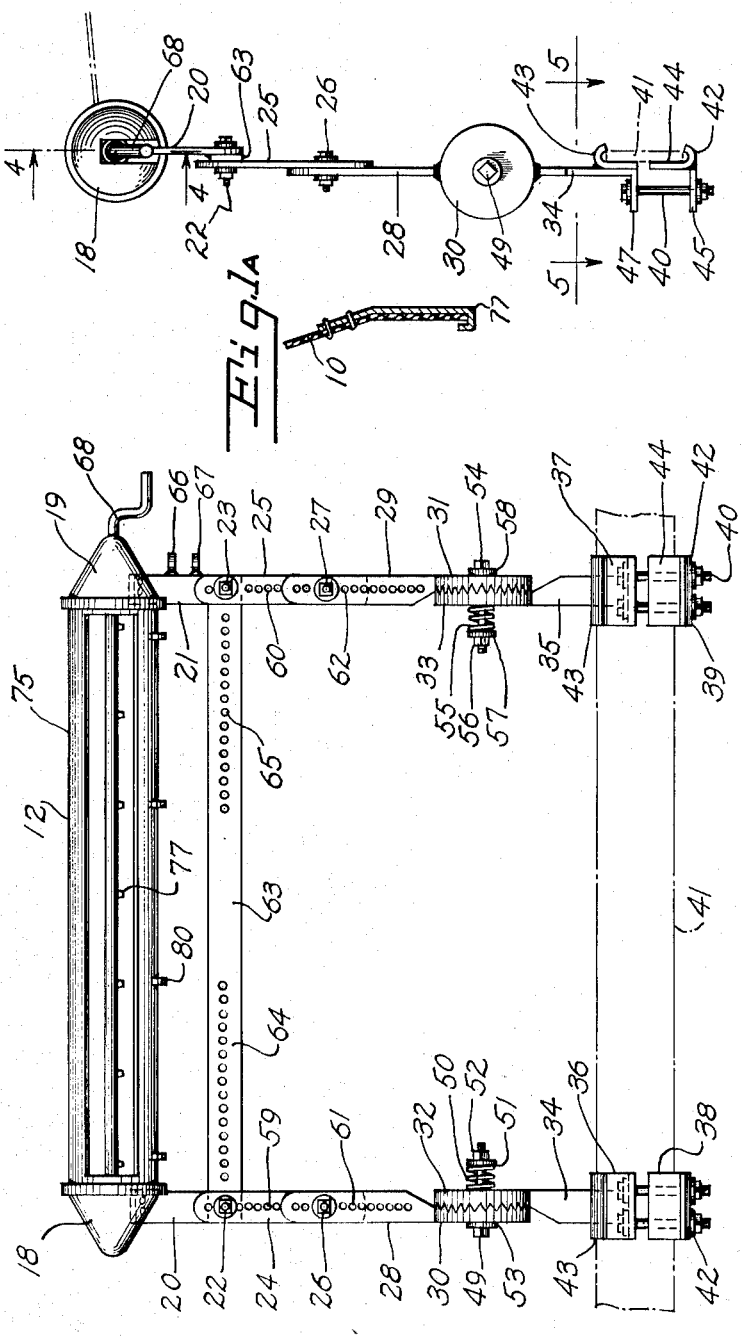

Nov. 22, 1955   H. B. VALENTINE   2,724,395
AUTOMOBILE COVER

Filed Dec. 31, 1952   4 Sheets-Sheet 3

INVENTOR.
Hubert B. Valentine
BY Victor J. Evans
ATTORNEYS

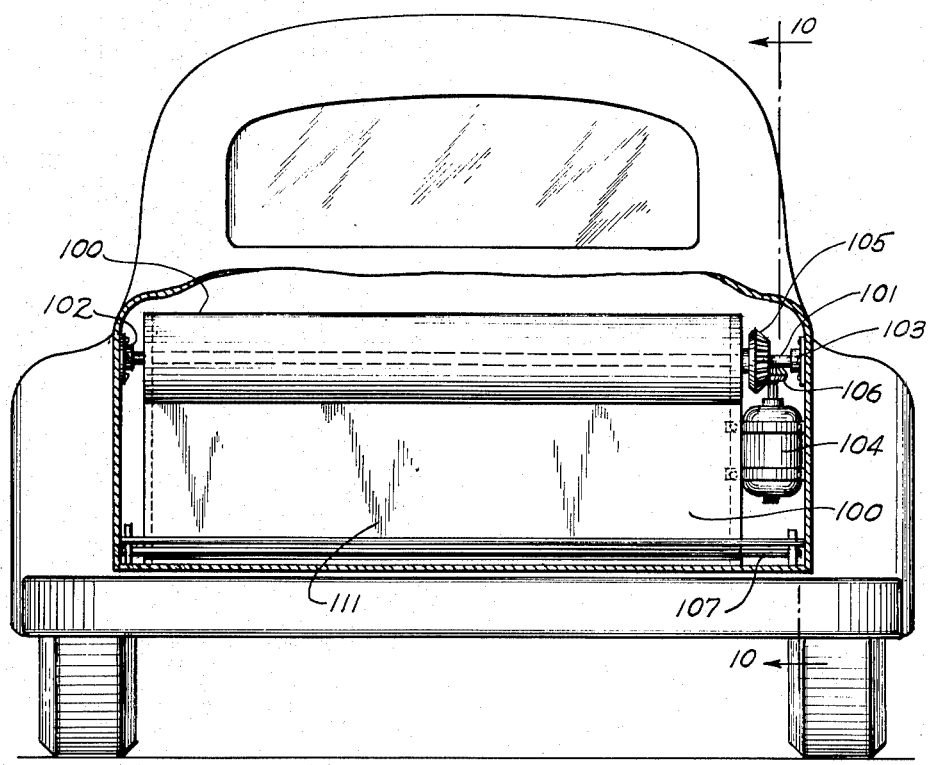
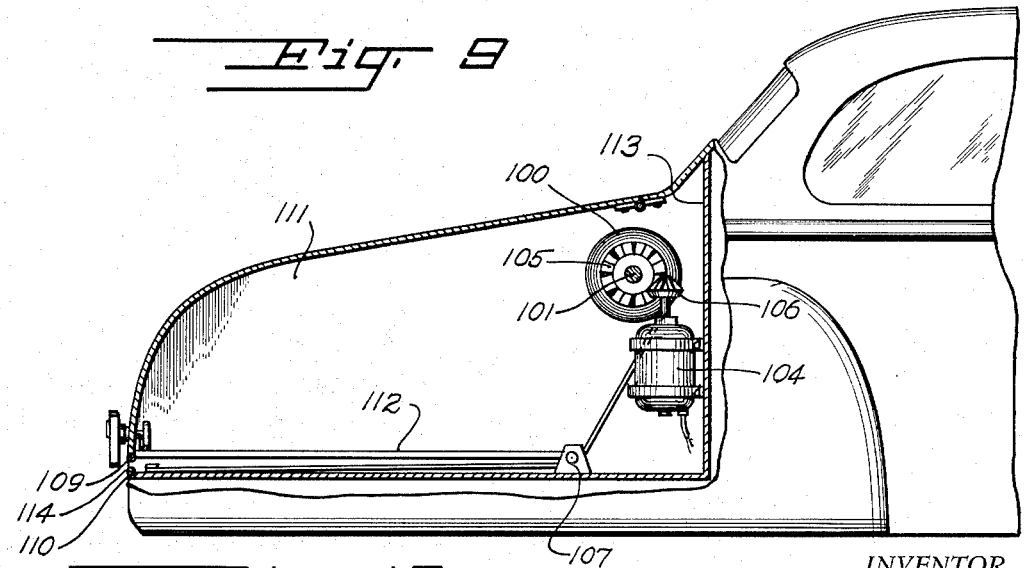

United States Patent Office 2,724,395
Patented Nov. 22, 1955

2,724,395

AUTOMOBILE COVER

Hubert B. Valentine, Vernon, Tex.

Application December 31, 1952, Serial No. 328,845

4 Claims. (Cl. 135—1)

This invention relates to covers for motor vehicles particularly of the pleasure type, and in particular a sheet of material adapted to form a cover for a motor vehicle carried on a roller mounted in or on the vehicle and adapted to be drawn outwardly to cover the vehicle.

In numerous instances motor vehicles are parked in the open where they are subjected to the weather continuously and as sheets of material, of a size sufficient to provide a motor vehicle cover are difficult to handle, covers are very seldom used. For this reason this invention includes a motor vehicle cover rolled on a holder and adapted to be incorporated in the body of a vehicle so that it is hidden when not in use, or mounted on the chassis or on a bumper of the vehicle whereby it is out of the way when not in use.

The purpose of this invention is to provide means for mounting a cover on a motor vehicle whereby the cover may readily be extended for use and may be rolled when not in use.

Various types of covers have been provided for motor vehicles. However, it is difficult to mount the covers on the vehicles without fastening parts thereof to the vehicle top or to the fenders and many vehicle owners object to making permanent connections through the fenders or other parts of the vehicle. With this thought in mind this invention contemplates a motor vehicle cover that is mounted in a housing in which it may be rolled for storing at one end of the vehicle and in which the cover may readily be drawn to a position substantially covering the vehicle and secured at the end of the vehicle opposite to that on which the roller is positioned, whereby the cover is adapted to be secured at both ends of the vehicle.

The object of this invention is, therefore, to provide a vehicle cover and means for mounting the cover on the vehicle whereby the cover is secured to the vehicle at both ends thereof when extended for use.

Another object of the invention is to provide a complete cover for a motor vehicle and means for mounting the cover on the vehicle wherein the cover is adapted to be applied without making permanent connections to the vehicle body or without changing parts of the vehicle.

A further object of the invention is to provide a cover in combination with mounting means therefore wherein the cover may readily be applied to a motor vehicle and in which the cover and mounting means are of a simple and economical construction.

With these and other objects and advantages in view the invention embodies a cylinder having a roller with a crank extended from one end journaled therein, a motor vehicle cover positioned on the roller in the cylinder, vertically disposed supports including bars having rows of spaced openings therein with means for bolting the bar together, with toothed discs connecting some of the bars for adjusting the positions of the bars and with clamps for securing the lower ends of the bars to a bumper of a motor vehicle.

Other features and advantages of the invention will appear from the following description taken in connection with the drawings, wherein:

Figure 1 is a side elevational view illustrating the improved cover positioned on a motor vehicle.

Figure 1a is a view showing certain constructional details in section of the clamp.

Figure 2 is an end elevational view of the cover mounting elements with the parts shown on an enlarged scale and with a bumper to which the supporting elements are clamped, shown in broken lines.

Figure 3 is a side elevational view of the supporting elements with the elements as shown in Fig. 2.

Figure 4 is a longitudinal section taken on line 4—4 of Fig. 3 illustrating the cover mounting roller with the surrounding cylindrical housing.

Figure 5 is a sectional plan taken on line 5—5 of Fig. 3 showing the upper jaw of one of the bumper clamps.

Figure 6 is a similar view showing a plan view of the lower jaw of one of the bumper clamps with other parts omitted.

Figure 9 is an end elevational view of the rear of a vehicle with parts broken away illustrating a further modification wherein the cover carrying roller is positioned in the trunk of the vehicle.

Figure 10 is a side elevational view showing the rear portion of a motor vehicle with parts broken away showing the roller positioned as shown in Fig. 9.

Figure 7:
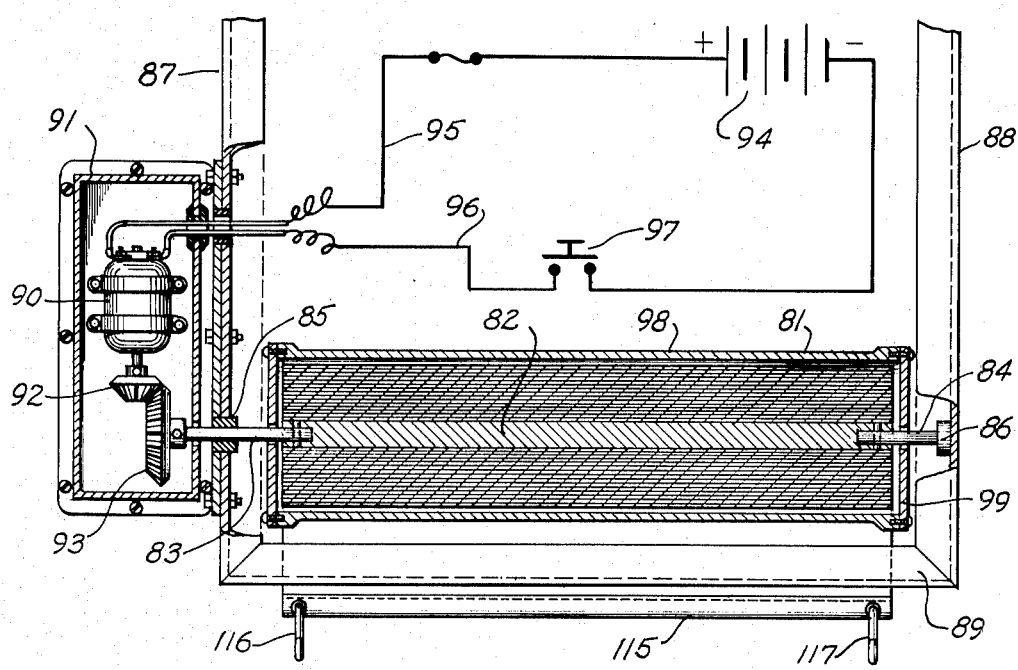
Figure 7 is a plan view with the cover roller shown in section and with parts broken away illustrating a modification wherein the roller is mounted in the end of the chassis of a vehicle and is driven by a motor.

Referring now to the drawings wherein like reference characters denote corresponding parts the improved motor vehicle cover and mounting therefor as illustrated in Figs. 1 to 6 includes a cover having a continuous center panel 10 with sides 11, a cylindrical casing 12 with a tubular shaft or spring actuated roll 13 journaled by sleeves 14 and 15 in bearings 16 and 17, respectively in conical-shaped end sections 18 and 19 thereof, and supports including arms or ears 20 and 21 pivotally mounted by bolts 22 and 23 on the upper ends of upper bars 24 and 25 and the upper bars are pivotally connected by bolts 26 and 27 to arms 28 and 29 that extend upwardly from toothed discs 30 and 31 which are positioned in corresponding discs 32 and 33 on the upper ends of arms 34 and 35 that extend upwardly from upper sections 36 and 37 of clamps which include lower sections 38 and 39 to which the upper sections are connected with bolts 40.

With the parts formed in this manner the upper and lower sections of the clamps are secured by the bolts to a bumper, as indicated by the numeral 41 with arcuate jaws 42 of the sections 38 and 39 extended around the lower edges of the bumper and with arcuate jaws 43 of the upper sections 36 and 37 extended over the upper edge.

The lower sections 38 and 39 of the clamps are provided with back plates 44 and flanges 45 with elongated bolt receiving slots 46 therein extending from the lower edge.

The upper sections 36 and 37 of the bumper clamp are provided with flanges 47, which extend from the lower edges of the clamp sections and the flanges are provided with elongated bolt receiving slots 48, corresponding to the slots 46 of the lower section.

The arms 34 and 35 extend upwardly from the upper sections of the clamps and the upper ends of the arms are twisted with a half twist whereby the flat section of the arms are secured, preferably by welding, to the discs 32 and 33.

The lower bars 28 and 29 are also formed with half twists which provides flat sections that are secured to the discs 30 and 31 by welding or the like.

The discs 30 and 32 are secured in assembled relation by a bolt 49 on which is a spring 50 and the spring is positioned between the disc 32 and a washer 51 that is secured on the threaded end of the bolt 49 by a nut 52. A washer 53 is provided under the head of the bolt.

The discs 31 and 33 are secured together in a similar manner whereby the bolt 54 extends through the discs and a spring 55 is secured in position on the bolt with a nut 56 and a washer 57. The bolt 54 is also provided with a washer 58 that is positioned below the head.

The upper bars 24 and 25 are provided with rows of spaced openings 59 and 60 and similar openings 61 and 62 are provided in the lower bars 28 and 29. By this means the elevation of the cylinder 12 is readily adjustable.

The upper ends of the supports are connected with a cross bar 63, the ends of which are provided with spaced openings 64 and 65 and by this means the distance between the supports is readily adjustable.

The arm 21 at the upper end of one of the supports is provided with spaced ears or spring clips 66 and 67 which provide means for holding a crank 68 that extends into the end of the tubular shaft 13, when the crank is not in use.

The crank 68, as illustrated in Figure 4 is adapted to be moved into and out of engagement with a slot 69 in the shaft 13. A pin 70 is carried by the crank, and the crank may be withdrawn from the slot and positioned in the clips 66 and 67.

The tubular shaft 13 is provided with enlarged flanges 71 and 72 that are positioned in annular sections 73 and 74, respectively at the ends of the cylindrical casing. These flanges provides guides with which the cover 10 is retained in alignment in winding the cover on the shaft. The casing 12 is provided with an elongated slot 75 through which the cover extends and the end of the cover is provided with a panel or hem 76 to which rubber clips or the like as indicated by the numeral 77 are attached and the clips 77 are positioned to extend over the lower edge of a bumper as indicated by the numeral 78 at the forward end of the vehicle. By this means the cover is securely held at both the front and rear and with the cover fitting snugly over the vehicle it is not subjected to abuse by wind and the like.

The lower side of the cylindrical casing 12 is provided with drain openings 79 and plugs 80 may be positioned in these openings if desired.

Figure 8:
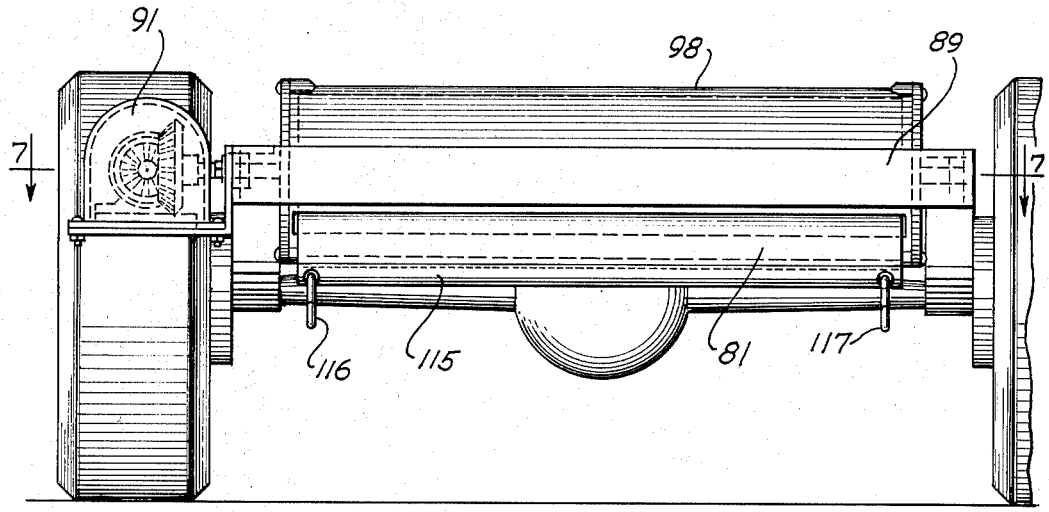
Figure 8 is an end elevational view showing the cover roller in the position shown in Fig. 7.

The cover may also be provided as shown in Figs. 7 and 8 wherein a cover 81 is mounted on a shaft 82 which is journaled by pins 83 and 84 in bearings 85 and 86 in side bars 87 and 88 of the chassis of a vehicle, and with the parts mounted in this manner the cover 81 is adapted to be withdrawn below an end bar 89 or through a slot in the vehicle as shown in Fig. 10.

The shaft 82 is adapted to be actuated to wind the cover thereon by a motor 90 in a housing 91 on one side of the chassis, with the motor driving the shaft through gears 92 and 93. The motor may be connected to the battery 94 of the vehicle with wires 95 and 96 and a switch 97 may be provided in one of said wires.

The cover is enclosed in a tubular casing 98 having ends 99 and the casing may be mounted in the chassis or in the trunk or luggage compartment.

In the design shown in Figs. 9 and 10 a cover 100 on a spool or drum is mounted on a shaft 101 which is journaled in bearings 102 and 103, and the shaft is rotated to rewind the cover by a motor 104 through gears 105 and 106. From the shaft 101 the cover travels over an idler roller 107 in bearings 108, and from the roller 107 the cover extends between spaced rollers 109 and 110 at the rear of a motor vehicle body.

The luggage compartment or trunk 111 may be provided with a false bottom 112 which protects the cover. The motor 104 is mounted on a fire wall 113 of the vehicle.

It will be understood that the cover may be incorporated in the rear portion of a motor vehicle or mounted on the vehicle by other suitable means.

Where the cover is positioned in the trunk it may be withdrawn by opening the cover, or it may be drawn through a slot 114 in the rear wall of the vehicle.

The extended end of the cover is provided with a bar 115 having rings or fasteners 116 and 117 thereon, and by this means the extended end of the cover may be attached to the end of the vehicle opposite to that in which the roll is positioned.

It will be understood that modifications, within the scope of the appended claims, may be made in the design and arrangement of the parts without departing from the spirit of the invention.

What is claimed is:

1. In a motor vehicle cover, the combination which comprises a cylindrical casing having an elongated slot therein and having arms extended from the ends, said arms positioned in planes perpendicular to the axis of the casing, a tubular shaft journaled in the casing, a crank extended from one end of the shaft through the end of the casing for manually rotating the shaft, a cover mounted on the shaft and positioned to be withdrawn from the casing and extended over the motor vehicle, clips on the ends of the cover for attaching the extended end of the cover to a bumper of a vehicle, spaced parallel vertically disposed supports secured to the arms extended from the ends of the cylindrical casing, clamps on the ends of the supports opposite to the ends connected to the arms extended from the casing for mounting the supports on a bumper of a motor vehicle, and means for adjusting the length of said supports.

2. In a motor vehicle cover, the combination which comprises a cylindrical casing having an elongated slot therein and having arms extended from the ends, said arms positioned in planes perpendicular to the axis of the casing, a tubular shaft journaled in the casing, a crank extended from one end of the shaft through the end of the casing for manually rotating the shaft, a cover mounted on the shaft and positioned to be withdrawn from the casing and extended over the motor vehicle, clips on the ends of the cover for attaching the extended end of the cover to a bumper of a vehicle, spaced parallel vertically disposed supports secured to the arms extended from the ends of the cylindrical casing, clamps on the ends of the supports opposite to the ends connected to the arms extended from the casing for mounting the supports on a bumper of a motor vehicle, said supports including toothed discs and means resiliently holding the discs together for adjusting the angular positions of the supports and bars having rows of spaced openings with bolts extended through the openings for adjusting the lengths of the supports.

3. In combination with a vehicle having front and rear bumpers, a cover including a continuous center panel and side sections, a horizontally disposed cylindrical casing arranged at the rear of the vehicle, a shaft positioned in said casing, clamps detachably connected to the rear bumper of the vehicle, each of said clamps including a lower section having a flange provided with elongated slots, a back plate on said lower section, said each of said clamps further including an upper section provided with a flange having slots registering with the slots in said lower section, securing elements extending through said registering slots, a pair of spaced parallel vertically disposed arms extending upwardly from said clamps, a first toothed disc mounted on the upper end of each of said arms, a second toothed disc arranged in engagement with each of said first toothed discs, a bolt extending through each pair of cooperating discs, a coil spring circumposed on each of said bolts and abutting said first disc, a bar extending upwardly from each of said second discs and provided with a plurality of spaced openings, an arm extending upwardly from each of said last named bars and provided with a plurality of spaced openings, securing elements extending through the openings in said arms and bars, an ear extending upwardly from each of said arms supporting said casing, a cross bar extending between said arms and adjustably connected thereto, an enlarged flange on each end of said shaft providing guides, said casing being provided with an elongated slot through which the cover extends, clips secured to said cover for engagement with the front bumper of the vehicle, there being a plurality of drainage openings in the bottom of said casing, and means for rotating said shaft.

4. In combination with a vehicle having front and rear bumpers, a cover, a horizontally disposed casing arranged at the rear of the vehicle, clamps detachably connected to the rear bumper of the vehicle, each of said clamps including a lower section having a flange provided with elongated slots, a back plate on said lower section, said each of said clamps further including an upper section provided with a flange having slots registering with the slots in said lower section, securing elements extending through said registering slots, a pair of spaced parallel vertically disposed arms extending upwardly from said clamps, a first toothed disc mounted on the upper end of each of said arms, a second toothed disc arranged in engagement with each of said first toothed discs, a bolt extending through each pair of cooperating discs, a coil spring circumposed on each of said bolts and abutting said first disc, a bar extending upwardly from each of said second discs and provided with a plurality of spaced openings, an arm extending upwardly from each of said last named bars and provided with a plurality of spaced openings, securing elements extending through the openings in said arms and bars, an ear extending upwardly from each of said arms supporting said casing, a cross bar extending between said arms and adjustably connected thereto, said casing being provided with an elongated slot through which the cover extends, and clips secured to said cover for engagement with the front bumper of the vehicle.

References Cited in the file of this patent
UNITED STATES PATENTS

| | | |
|---|---|---|
| 1,220,134 | Jurk | Mar. 20, 1917 |
| 1,708,702 | Moorhouse | Apr. 9, 1929 |
| 1,719,055 | Herzer | July 2, 1929 |
| 1,905,973 | Levine | Apr. 25, 1933 |
| 1,912,231 | Wandscheer | May 30, 1933 |
| 1,918,423 | Persinger | July 18, 1933 |
| 2,666,840 | Poirier | Jan. 19, 1954 |